Figure 1:
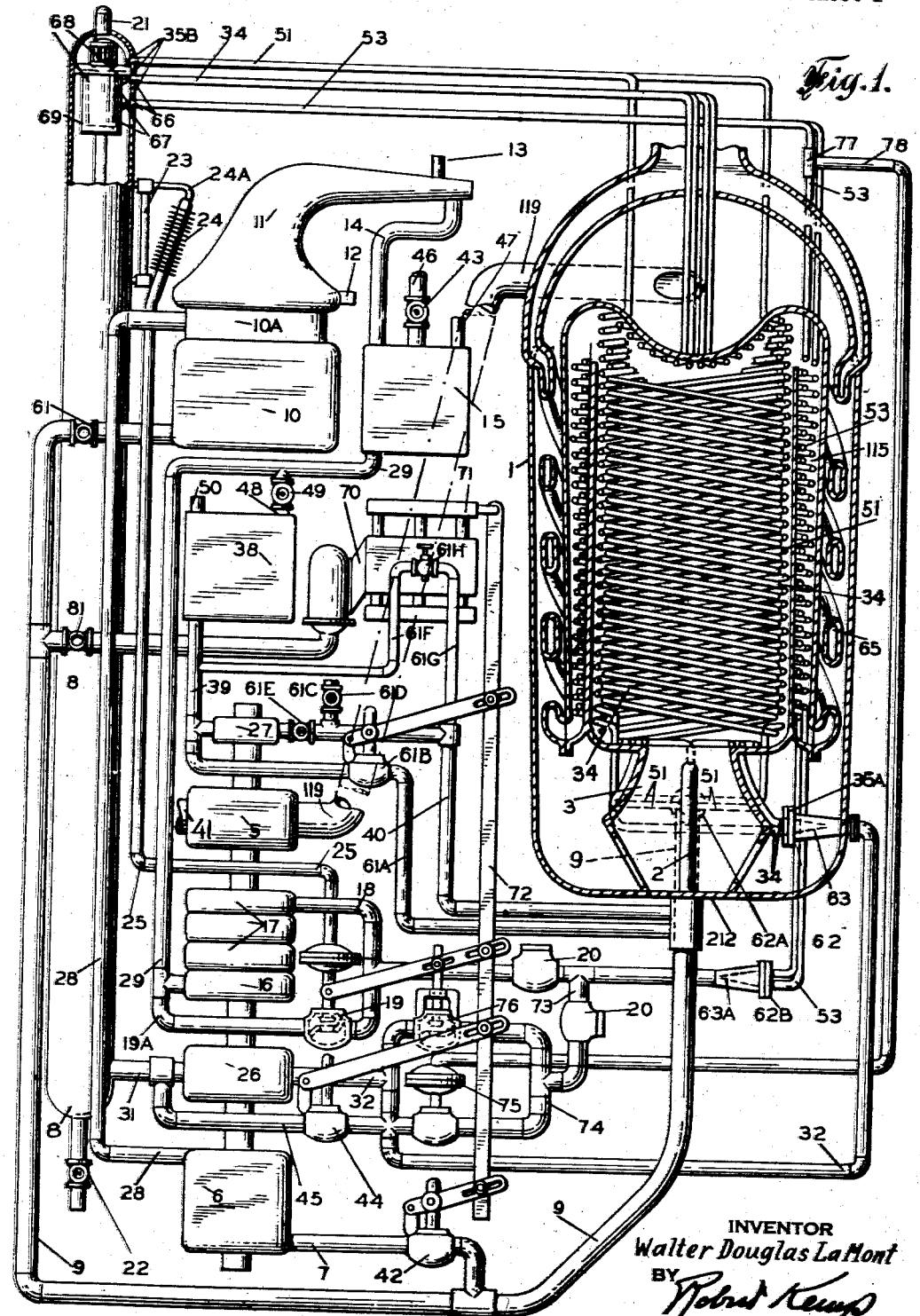

Oct. 7, 1941.  W. D. LA MONT  2,257,749
HIGH SPEED STEAM POWER PLANT AND METHOD OF OPERATING SAID POWER PLANT
Original Filed Oct. 16, 1933  2 Sheets-Sheet 2

INVENTOR.
Walter Douglas La Mont
BY
ATTORNEY.

Patented Oct. 7, 1941

2,257,749

UNITED STATES PATENT OFFICE 2,257,749

HIGH SPEED STEAM POWER PLANT AND METHOD OF OPERATING SAID POWER PLANT

Walter Douglas La Mont, North Colebrook, Conn., assignor to W. D. La Mont Inc., Wilmington, Del., a corporation of Delaware Original application October 16, 1933, Serial No. 693,714. Divided and this application June 5, 1934, Serial No. 729,162

10 Claims. (Cl. 122—451.1)

This invention relates to high speed steam power producing apparatus and high speed methods of operating the same.

This application is a true divisional application from application Ser. No. 693,714, filed October 16, 1933.

It deals with supercharged steam boilers in combination with high speed, light weight power plants using such a boiler, especially a boiler burning fluid fuels, in which all fluids; namely, the fuel, the air (for supporting combustion), and the main working fluid in the tubes of the boiler; each flow at extremely high velocities in the performance of their several duties in the boiler and then in the power plant as a whole.

The present invention is primarily concerned with the correlation of water circulating through the economizer tubes with the heat conditions of the steam generator so that at no time is there any danger of these tubes being damaged by the failure of circulation of water therethrough, as for example, when the source of feed water may be shut off.

This present invention is particularly concerned with the improvement of high speed steam boilers and power plants embodying the same and methods of operating said boilers and said power plants. Where my invention and/or any of its features, applies to flash boilers or mass boiling boilers and to high speed power plants using said flash boilers or mass boiling boilers, such improvements are well within the scope of my invention as herein described.

While my invention is described herein as relating to steam generating apparatus and is intended especially for the generation of steam from water, it will be understood that the terms "steam" and "water" as used in the specifications and claims as intended to include as equivalents, any liquids which might be handled by the novel process and/or apparatus herein described, resulting in the generation of any vapors which might be handled by, or be useful in connection with my process and/or apparatus, and it will also be understood that many of the novel features of this invention are applicable in other fields than that for which the apparatus herein specifically illustrated and described is particularly intended.

Other objects and features will be particularly pointed out and disclosed hereinafter in the illustrations, descriptions, specifications and claims of this present patent application.

Figure 2:
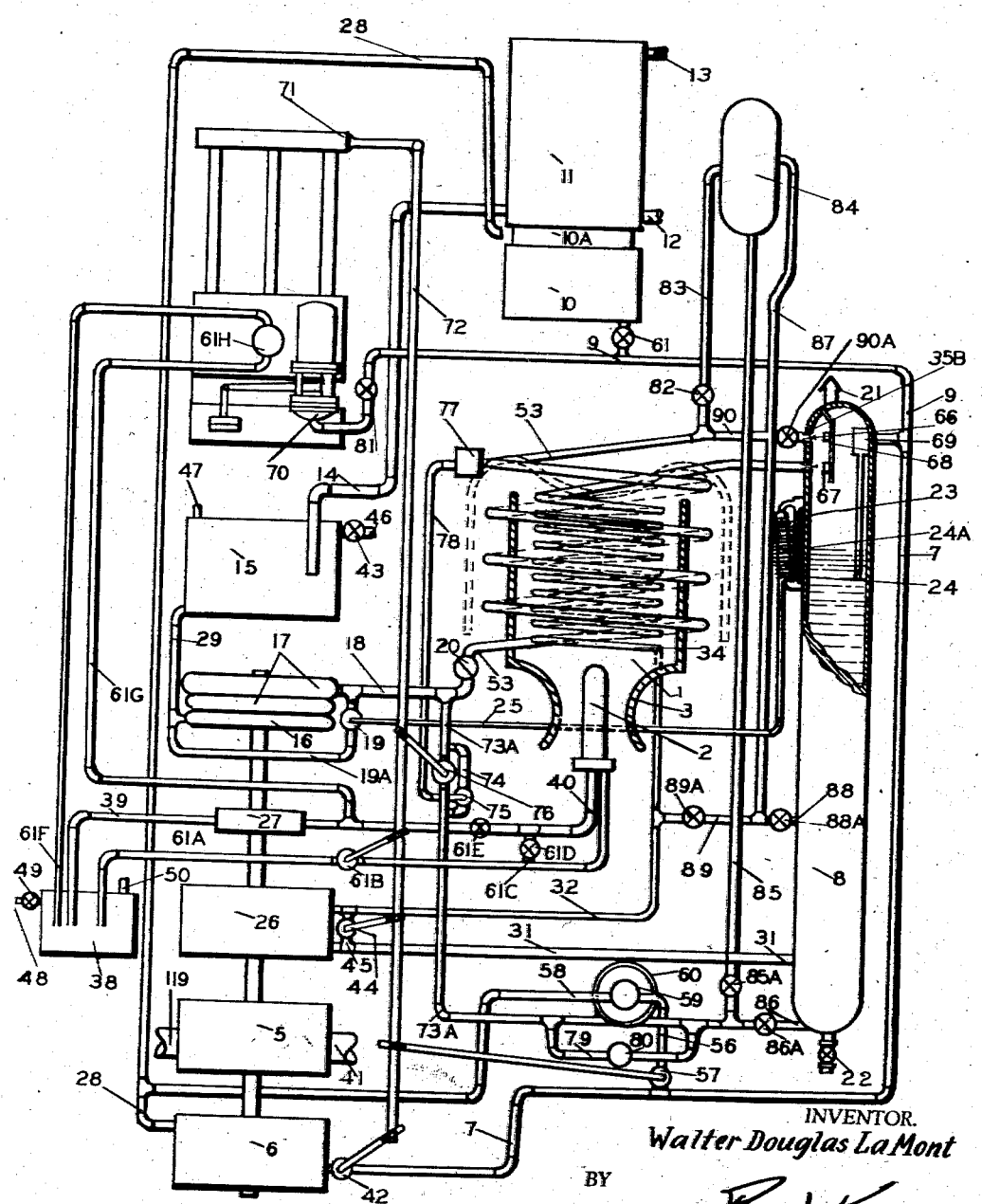

In the drawings:

Fig. 1 shows a diagrammatic layout of the power plant, in accordance with the present invention, with a cross-sectional view of the high speed steam generator forming a part thereof; and Fig. 2 is a diagrammatic layout of the supercharged high speed steam boiler and power unit operated in a manner similar to the arrangement shown in Figure 1, but with the additional showings of how the fluid heater may be operated with various connections, including the use of a separate circulating pump for the fluid heater. The high speed boiler 1 includes waterwall coils 34, superheater coils 51, fluid heater coils 53, air-preheater with air preheater tubes 65, casings, streamlined passages for gas and air, burner 2 and necessary pipe connections to water level cylinder 8 and to the various auxiliaries and controls. The main turbine 10 is shown with its exhaust lead 10A and main condenser 11.

The auxiliary turbine 6 is shown driving on one shaft the boiler circulating pump 26, condensate pump 16, feed pump 17, air supercharger 5 and oil pump 27. The connections of these auxiliaries are shown with their various control valves and by-passes.

The master combustion control apparatus 70 is shown with its moving arm 71 and moving control rod 72 and connections to the various control valves.

The water level regulator 24 is shown with its control element 24A control valve 19 and interconnection with control valve 76.

The thermostat control is shown with its control element 77 on the fluid heater tube 53 and its control valve 75.

The feed tank and oil tank are shown with their various connections, valves and control features. These elements are described in detail below.

In Fig. 2, the diagrammatic view of my steam generator is represented by a waterwall tube coil 34, and a fluid heater tube coil 53, with an indicated part of the casing together with the burner 2. The connections of the water wall tube 34, fluid heater tube 53, and burner 2, are shown with their various valves and control features.

The water level cylinder 8 and fluid heater water reservoir 84 are shown with their connections, valves, and control features. The main turbine 10, is shown with its exhaust lead 10A, and main condenser 11. The auxiliary turbine 6, is shown driving on one shaft air supercharger 5, circulating pump 26, of the steam generator, feed oil pump 27, condensate pump 16, and feed pump 17. The connections of these auxiliaries are shown with their various control valves and by-passes.

The separate circulating pump 60, for the fluid heater is shown with its auxiliary turbine 59 and the various connections, valves and control features. The master combustion control apparatus 70 is shown with its moving arm 71 and moving control rod 72 and connections to the various control valves. The water level regulator 24 is shown with its control element 24A and control valve 19. The thermostat control is shown with its control element 77 on the fluid heater tube 53 and its control valve 75. The feed tank and oil tank are shown with their various connections, valves and control features.

I have found that, owing to the very high initial temperatures and very high gas velocities with resulting very rapid rate of heat transfer of the convention surfaces in my supercharged high speed steam generators, the present day economizer is not satisfactory for use with certain types of my steam generators.

In the customary economizer the total quantity of water available for forced circulation is that of the feed water only. This quantity of feed water available for forced circulation at any time is generally more a question of the height of the water-level rather than the rate of evaporation. In operation of the economizer, the water level might be high and the feed water shut off or the feed input considerably reduced at a time of increase in heat load.

With a high water level at a time of sudden change to high heat load, the feed may be shut off entirely or it may be feeding the economizer tubes at a very low rate of input, for a considerable period of time.

This condition wherein present day economizers, at times, do not permit the co-ordinating of the amount of water used in the forced circulation with pressure drop devices in the tubes regardless of the water level in the steam generator; to meet the rate of heat released, imposed on said tubes; makes the present day economizer unsatisfactory for use with certain types of my supercharged high speed steam generators.

*Fluid heater*

I have found that a new type of fluid heater is required in place of the present day economizer used with steam generating apparatus.

My new fluid heater will at all times permit the co-ordination of the amount of water used in forced circulation with the pressure drop devices used in the tubes of said heater, irrespective of the height of the water level, so that proper pressure drop to insure positive delivery of water into each tube can be obtained together with the required quantity of water circulated to insure proper operation of each tube at all times to meet any condition of heat load imposed on said tubes at any time.

To retain full advantages of the heat head obtainable from using feed water, said new type of heater should use a minimum of additional water of higher initial temperature than the feed water, for forced circulation, and use it only when required to augment an insufficient quantity of feed water input which alone, at the time and with the given heat load of that moment, is unable to protect or insure proper operation of said surface.

The tubes of said new type of heater, to meet all necessary conditions of proper operations of the steam generating apparatus with its required quantity of water for forced circulation, will at times require feed water only, at other times said tubes will require feed water augmented by additional water from another source or augmented by recirculation of the feed water in the tubes, and at still other times the total quantity of water used in said tubes will be that of water from another source or of feed water recirculated without any input of new feed water.

The tubes of said heating surface of this new type of fluid heater, at various times during the operation of a steam generating apparatus with which said surface may be used, may be heating water only, or may be heating water and vapour or water and steam. Said surface may or may not generate steam, and irrespective of whether or not said surface generates steam said surface may or may not be using feed water only; may or may not be using input of feed water together with its recirculation water or with circulation of additional water from another source, and it may or may not use circulation of water from another source or recirculation of its water without any new input of make up feed water.

If the feed water is used in recirculation, it can no longer be properly referred to as feed water, any more than the water in the remaining portions of the steam generator is properly or generally referred to as feed water.

Since this new type of heater at various times may or may not generate steam and may or may not be using incoming feed water only, or incoming feed water in combination with other water, it is not strictly a steam generator or a feed heater. As a result I call it a "fluid heater."

By the term "fluid heater," is meant, a heater of fluid such as water, and/or vapour, or steam in a steam generating apparatus or its equivalent, said fluid to be heated comprising the liquid as first entering the system and/or the liquid as first entering the system recirculated in the heater and/or the liquid from another portion of the apparatus circulated in the heater.

I have found that a fluid heater of said new type to satisfactorily meet all conditions of operation of its tubes used with my supercharged high speed steam generators, may be built and operated as follows.

The heating surface used in the fluid heater may be made up of a tube or group of tubes arranged as desired.

The said heating surface may be exposed to radiant heat, convection heat, and/or a combination of both.

A connection for input of feed water from the feed pump is made to the tube or tubes of the fluid heater for entrance of feed water to inlet ends.

The discharge ends of the tubes of the fluid heater are connected directly to the remaining part of the steam generating apparatus above or below the water level or indirectly to either point by means of a header or headers, or water reservoir arrangement, or the fluid heater may be discharged into the water wall tubing on the discharge side of the circulating pump.

If the main steam generating apparatus uses a forced circulation means with recirculation, such as a circulating pump, and if weight and space are of primary importance limiting the number of pumps used to a minimum; then the fluid heater preferably has a second connection or cross-connection, from the discharge end of said circulating pump to the inlet end of the fluid heater, arranged to permit recirculation of the water in the fluid heater in addition to the recirculation of the water in the other part of the steam generating apparatus.

This second connection from the discharge end of said circulating pump, to the inlet of said fluid heater is controlled by a valve or valves or other regulating means for stopping, starting or adjusting the amount of the flow of water from said circulating pump into said inlet end of the fluid heater.

If the main steam generating apparatus does not use forced circulation, with a circulating pump for recirculation, or if efficiency, or other conditions of operation are important enough to make it desirable to use an additional pump for separate recirculation in the fluid heater with consequent increase in weight, whether or not the main steam generating apparatus has a pump or pumps for recirculation; then the fluid heater uses a separate pump or pumps for recirculation in its circuit of the proper size for the purpose. This separate pump or pumps has its and/or their discharge end connected to the inlet of the fluid heater.

The suction end of said separate pump may connect directly with the discharge end of the fluid heater if it is arranged so that the suction lead will receive some or all of the water discharged from the fluid heater prior to some of said water discharging on over into the main steam generating apparatus, if there is, under the operating condition of the fluid heater at the time, any excess of water to be sent to the main steam generating apparatus over and above that necessary for use in giving recirculation to the fluid heater.

When the separate pump is connected in this way the temperature of the water recirculated for a short period of time is of lower temperature than the water in the main steam generator with a consequent advantage of greater heat differential of the fluid and the heater heating surface.

The suction end of said separate pump 60 may, however, be connected directly with the water level cylinder 8, by opening valve 86A and closing valve 85A and the discharge of the fluid heater tubes 53, led directly to the water level cylinder 8, by closing valve 82, and opening valve 90A or by opening valve 82, and valve 88 closing valve 89A, the discharge may be indirect.

In all cases the discharge of said separate circulating pump 60, leading to the inlet end of the fluid heater tube 53, has a valve 76 and/or 75 or other regulating means on the discharge line or control of the pump for starting, stopping, or adjusting the amount of flow of water form the separate circulating pump 60, to the inlet of the fluid heater tubes 53.

This starting, stopping or adjusting of the amount of water from the separate circulating pump 60 to the inlet of the fluid heater tubes 53, may be mainly accomplished by starting, stopping, or adjusting the speed of the separate circulating pump 60 or by means of a valve 76, and/or 75, if a valve is used, or by a combination of means. Regardless of whether a main circulating pump 26, of the steam generating apparatus is used to discharge to the fluid heater tubes 53, or a separate pump 60, is used for this purpose or both, or whether the suction of the pump used has a connection to the steam generating apparatus or both, and/or whether a valve is used as a regulating means from the discharge of said pump to the fluid heater or the pumps are started, stopped or their speed adjusted or whether they are operated in combination with a valve or not; the flow from the pump or pumps to the fluid heater is always adjusted to meet the following conditions:

There is preferably no flow when the fluid heater has sufficient feed water or other water in it to protect it and to insure its proper operation without use of recirculating water even with the feed valve closed. There should aways be available sufficient flow from the circulating pump to the fluid heater to protect the fluid heater tubes 53 and insure their proper operation if such flow is required from the recirculation means. This flow to occur in addition to the flow from the feed pump 17 whenever necessary regardless of whether the feed valve 19 is partially or fully opened, and regardless of the rate of input of the feed pump or the height of the water level.

The operation of the control means of the flow to the fluid heater from the pump or pumps used for recirculation whether by valve or speed regulation of the pump or other means including by-passing, can be obtained in a number of ways.

The control of the valve, pump speed, by-passing, or other means is preferably operated by a thermostat control on the fluid heater tube or tubes usually at or near the outlet of the tube.

The control of the valve, pump speed, by-passing or other means can be operated, by the degree of opening or closing of the by-pass feed valve, or by the water level regulator operating the control valve, to open the control valve when it opens the by-pass feed valve or the reverse or other control means may be used, causing said flow to increase as it opens the by-pass feed valve and said flow to decrease as it closes the by-pass feed valve.

The control of the flow control apparatus may be operated by the speed of the feed pump or the speed of the auxiliary turbine driving the air and/or oil to the combustion chamber, or it may be operated from the automatic combustion control device.

There might be a connection to the throttle to cover certain load conditions or periods or there might be a connection acting on the flow of the feed or the flow of the steam in the main steam line. Control of the flow from the cross connection may even be by hand by opening the cross connection and regulating the same for a given load, whenever the feed valve is regulated by hand.

Any means which will protect and insure proper operation of the fluid heater tubes, may be used whether it acts directly or in the case of the thermostat control on the fluid heater tubes, or indirectly by action from, for instance, the automatic combustion control or by a combination of both.

In the fluid heater, I preferably place pressure drop devices 35B in each fluid heater tube, to be coordinated with the amount of water circulated, as disclosed in my co-pending applications which have matured into Patents Nos. 2,201,616, 2,201,617, and 2,201,618, of May 21, 1940.

Although if the heat load on the fluid heater is sufficiently low the fluid heater may be used without pressure drop devices on certain types of steam generating apparatus. It is not intended to confine the use of this fluid heating apparatus to any particular type of steam generating apparatus. It may be applied to any type of steam generating apparatus or fluid heating and/or vapor generating apparatus.

Further, by adding a pump for recirculation with proper control valves, suction and discharge leads as described, for my fluid heater, in my present invention, present day economizers may be converted to fluid heaters and used as such in accordance with my present invention.

In my present invention my pressure drop device 35B is preferably at or near the outlet end of each tube of the steam generating apparatus when the steam generating apparatus is to be exposed to extreme heat loads. When the steam generating apparatus is not to be exposed to extreme heat loads, but operates at fairly constant load primarily for high efficiency then I preferably add a pressure drop device at or near the inlet end of each tube.

In my fluid heater apparatus as shown in my present invention the apparatus is built and operated as follows: when preferably used with a means for forced circulation on the boiler.

Heating surface in the form of several tubes 53 is placed in the flow of the convection gases. The feed water connection is arranged to deliver water directly from the feed pump 17 into each of these tubes of the fluid heater, via the feed stop and check valve.

The ends of the tubes 53 of the fluid heater are arranged in a compact group parallel to each other and secured in a disc 62B which in turn, fits directly into the feed line discharge 18. Feed flowing in this line 18 will be driven by the pump directly into each fluid heater tube, but said flow striking the flat disc where it enters the fluid heater tubes would be disrupted. To prevent this, streamlining at the entrance of the tube is resorted to, by placing a cone 63A in the feed line with its apex in the center of the feed line pointing toward the flow of the feed approaching it, and its base equal to the diameter of the disc in which the fluid heater tubes are secured and said base resting on, and is secured to said disc 62B also the diameter of the base of the cone equals the inside diameter of the feed line. The cone has holes in it from its apex to its base, said holes being of inside diameter equal to the inside diameter of each fluid heater tube 53 and leading directly thereto.

With this arrangement the feed flow strikes the apex point of the cone 63A and is evenly distributed in a smooth fluid flow down each tube 53 of the fluid heater.

The feed pump 17 is connected directly to the auxiliary turbine 6 which also drives the air supply and the oil supply.

The speed of this auxiliary turbine is controlled by the automatic combustion control 70 to give the proper air supply for combustion for any given load, but the size and speed of the feed pump 17 when directly connected to this auxiliary turbine 6 is designed to make available at least, ample feed water for protection and proper operation of the fluid heater tubes 53 at each load or rate of speed required for delivering proper air for the given combustion condition of said load. The amount of water actually delivered however, by the feed pump 17 into the fluid heater tube 53 is controlled by a by-pass arrangement on the feed pump 17 said by-pass 19A being controlled by a valve 19 operated by the water level regulation device 24. A cross connection 73 controlled by automatic valve 75 and 76 is made from the discharge of the steam generator circulating pump 26 to the inlet of the fluid heater.

The cross connection 73A connects to the inlet of the fluid heater tube 53 through the intermediary of the feed stop and check valve 20. The cross connection has two automatic valves 75 and 76 on a by-pass around the other automatic valve.

The fluid heater tubes 53 discharge directly into the water level cylinder 8 above the water level of the steam generator apparatus.

When the steam generating system is to be used for extreme heat loads a pressure drop device 35B is positioned in the outer end of each fluid heater tube 53. Just beyond this pressure drop device 35B there is located at the outlet end of each tube 53 and individual mechanical means 66 for separating the water discharged, from any steam that may have been formed in the tube.

This new method of a mechanical means for separation of steam and water from each individual tube, as it is discharged therefrom is important. By immediate separation action on the volume of steam and water coming from a single tube, the volume and resulting velocities to be handled by the separating device is much smaller than when attempting to separate the output of a group of tubes and the separation device can be designed to act more effectively if there is one for each tube instead of one for a group of tubes. Further, in the case of the present invention, the pressure drop devices at the outlet of each tube 53 are so designed that with the pressure drop effect, they give a preliminary breaking up of steam bubbles and separation of steam and water as they discharge from the tube and this preliminary separating action is immediately augmented by the individual separating device 66 for each tube 53 just beyond the outlet pressure drop device.

Additional means for separaton of steam and water dscharged from all the fluid heater tubes 53 is further provided at their points of discharge said separation means 67 and 68 acting as a common device for each group of tubes as distinct from the individual separating device in each tube. A still further separation of any steam mixed with the water from the fluid heater occurs when steam from the fluid heater passes through the main separator 69 in the water level cylinder 8 to go to the superheater 51. When the steam generating system is not to be used for extreme heat loads a pressure drop device 35A is added to or near the inlet end of each tube 53 in addition to the pressure drop device 35B already placed at the outlet end of each tube.

One automatic valve 75 in the cross connection 73A of the steam generator circulating pump discharge to the fluid heater is operated first by an automatic thermostat control device 77 on the outlet end of the fluid heater tube 53 exposed by position to the highest heat effects of the convection gases. This control primarily opens the automatic valve 75 on the cross connection 73A only when the fluid heater tube or steam therein begins to become heated above the temperature of the saturated steam of the steam generating apparatus or begins to discharge superheated steam and said thermostat control 77 closes the automatic cross connection valve 75 only when the fluid heater tube or steam temperature therein is at or below the temperature of saturated steam in the system. As a result this control protects the fluid heater tubes 53 from lack of water regardless of the height of the water level, operation of the feed valve 19 as closed, full open or partially open and regardless of the amount of water being forced in by the feed pump 17. This protection will continue as long as there is any water in the system to permit any operation of the main circulating pump 26 of the steam generating system. It is now only necessary to provide for proper operation of the fluid heater tubes at each heat load.

This is accomplished by the action of the second automatic valve 76 by-passed around the first valve 75 with thermostat control in the cross connection 73A.

This valve is operated primarily by the automatic combustion control apparatus 70 which opens valve 76 with increase in heat load demand and closes it with decrease in heat load demands, the amount of opening and closing at each heat load being determined from the test of the operation of the steam generating apparatus, and the valve setting made in accordance with requirements of the fluid heater at each of said heat load demands found from test.

The setting of this valve moved by the automatic combustion control, is modified by the action of the automatic water level regulating valve 19. That is for any given heat load setting, if the water level regulating valve 19 and by-pass 19A is closing a certain amount, it will move the lever point of the lever arm of the automatic combustion control device 70, acting on the bypass valve 76 in the cross connection 73A, thereby closing the by-pass valve 76 a certain amount, so that less water will be recirculated at the given heat load as more water is made available from the feed pump 17 and water level regulating device 24 if this water level regulating valve 19 is opening a certain amount it will move the lever point of the lever arm of the automatic combustion control device 70, acting on the bypass valve 76, in the cross connection 73A so that more water will be recirculated at the given heat load as less water is made available from the feed pump 17 and water level regulating device 24. This setting on the action of the water level regulating device 24 to modify the setting made by the combustion control device 70, is made from test at each heat load and the combined result of the said two settings at test is arranged to provide forced circulating of water, positively delivered into each tube of the fluid heater co-ordinated with pressure drop device, sufficient to insure proper operation of said tubes at each heat load imposed on said tube, regardless of the action of the feed water level regulating valve and with a minimum of water used in recirculation to accomplish this purpose.

In some designs the master combustion control is not used to augment the action of control valve 76. The control valve 86 in some designs is connected directly with water level regulator 19 opening and closing with by-pass valve 19 without connection to the master combustion control rod 72. In some designs control valve 76 is not used, the cross connection 73 being opened by thermostat valve 75.

Method of operation

A preferred embodiment of this invention is shown in Figure 1 which consists of a power unit with my supercharged high speed steam generator 1.

The steam generator 1, has its proper casings, passages, burner, and other parts necessary for the use of my waterwall tubes 34, in combustion chamber 106, my superheater tubes 51, in combustion chamber 106, my fluid heater tubes 53, in convection gas passage 115, and my spiral cross flow air preheater with burnt gas tubes 65 and air passage 115.

All piping, valves, auxiliaries and controls are shown for proper operation of my heat transfer surfaces together with the steam generator water level cylinder 8 for maintaining a water level in the system, a suction head for the circulation pump and a source of reserve power.

The main steam turbine 10 receives steam from the steam generator 1 exhausting to main condenser 11. The auxiliary turbine 6 drives on its shaft the air supercharger 5, condensate pump 16 feed pump 17 circulating pump 26 and oil pump 27.

A master combustion controller 70 operates all main controls to maintain a constant boiler pressure and to supply the boiler 1 with the necessary quantities of air, oil, feed water and circulating water for the proper operation of its heat transfer surfaces and to meet the various load demands.

The speed of the auxiliary turbine 6 is controlled by the master controller 70 to deliver the proper quantity of air.

The oil pump 27 and boiler circulating pump 26 have by-passes with control valves, operated by the master controller 70 to deliver the proper quantity of oil and circulating water as the auxiliary turbine speed is changed to meet the requirements for combustion.

The condensate pump 16 and feed pump 17 have a by-pass 19A with control valve 19 operated by a water level regulator 24 on the water level cylinder 8 to maintain a water level in the system.

The boiler circulating pump 26 has a cross connection 73 to the feed inlet with control valve 76 operated by the master controller 70 to augment the supply of water for the fluid heater as the heat load increases.

The opening and closing of cross connection control valve 76 is modified by the opening and closing of the feed water level regulator valve 19 so that when one valve is closing the other valve is closing. This eliminates the use of unnecessary quantities of heated water for recirculation in the fluid heater as changes in load occur.

The control valve 76 on cross connection 73 has a by-pass 74 with thermostat operated control valve 75. Thermostat control valve 75 is operated by a thermostat device 77 on the outlet end of a fluid heater tube 53. Whenever said tube 53 or the steam therein goes above the saturated temperature of the steam in the boiler thermostat element 77 opens valve 75 in by-pass 74 to protect the fluid heater tubes 53.

The general operation of the power unit is as follows:

Starting with a water level in the water level cylinder 8 water is sent by the circulating pump 26 to the waterwall tubes 34 of the boiler 1. Water and steam discharges from waterwall tubes 34 into the water level cylinder 8 where the steam and water are separated, steam going to the superheater tubes 51 and excess water going to the water level 8, where it is picked up by the circulating pump 26 with make up feed and recirculated in the system.

The steam in the superheater tubes 51 becomes highly superheated and passes to the main turbine 10 to main condenser 11 also to auxiliary turbine 6 and then to main condenser 11.

Condensate from main condenser 11 goes to feed water tank 15.

Starting with the feed water in feed water tank 15 this water is picked up by condensate pump 16 and sent to feed pump 17. The feed pump 17, by means of the by-pass 19A and control valve 19, supplies water to the fluid heater tubes 53, this supply being in accordance with the demands of the water level regulator 24 maintaining a water level in water level cylinder 8.

The circulating pump 26, by means of the by-pass 74 and thermostat valve 75 actuated by the thermostat 77 on fluid heater tube 53, and by means of the cross connection 73 and control valve 76 actuated by the master combustion control 70; supply water for recirculation in the fluid heater tubes 53 when necessary for protection and proper operation of the fluid heater tubes, independent of the water level at different load demands.

The feed water and recirculation water in the fluid heater tube 53 together with any steam formed is discharged into the water level cylinder 8 where the water and steam, if any, is separated. The steam going to the superheater tube 51 and the water going to the water level in water level cylinder 8 to be used for maintaining a water level, for recirculation and for formation of more steam.

I claim:

1. The method of protecting an economizer in a steam generator embodying steam generating tubes and an economizer with forced recirculation of steam in the steam generator tubes, by connecting the forced recirculation system to the economizer in response to thermal conditions at the outlet end of the economizer.

2. The method of protecting an economizer in a steam generator embodying steam generating tubes and an economizer with forced recirculation of water in the steam generator tubes, by connecting the forced recirculation system to the economizer in response to a predetermined temperature of the fluids in said economizer signifying the necessity for a supplemental supply of water to said economizer from said recirculation system.

3. A steam generator comprising steam generating tubes, an economizer, a water circulating pump arranged to give a forced water circulation through the steam generating tubes, a by-pass connection between the water circulating pump and the inlet of the economizer, a valve in said by-pass connection, and means responsive to the thermal condition of the economizer for controlling said valve.

4. In an apparatus of the class described, a steam generating tube, a feed water preheater tube, a circulating pump for forcing water into said feed water preheater tube, a by-pass connection extending between the output sides of said pumps and across the input ends of said tubes, a flow controlling device in said by-pass connection, and thermally operated means influenced by the contents of the feed water preheater tube controlling said device for connecting at times said circulating pump with said feed water preheater tube.

5. In an apparatus of the class described, a steam generating tube, a feed water preheater tube, a circulating pump for forcing water into said steam generating tube, a feed pump for forcing water into said feed water preheater tube, a by-pass connection extending between the output sides of said pumps and across the input ends of said tubes, a flow controlling device in said by-pass connection, and means controlled by the thermal condition of the fluid in the feed water preheater tube for operating said device to connect said circulating pump with said feed water preheater tube.

6. In an apparatus of the class described, a steam generating tube, a feed water preheater tube, a circulating pump for forcing water into said steam generating tube, a feed pump for forcing water into said feed water preheater tube, a by-pass connection extending between the output sides of said pumps and across the input ends of said tubes, a flow controlling device in said by-pass connection, and thermostatic means controlled by the temperature of the fluid in the feed water preheater tube for operating said device to connect said circulating pump with said feed water preheater tube.

7. In an apparatus of the class described, a steam generating tube, a feed water preheater tube, a circulating pump for forcing water into said steam generating tube, a feed pump for forcing water into said feed water preheater tube, a by-pass connection extending between the output sides of said pumps and across the input ends of said tubes, a valve in said by-pass connection, and thermally controlled means near the outlet end of said feed water preheater tube for operating said valve to connect said circulating pump with said feed water preheater tube upon the imminence of danger to said feed water preheater tube.

8. Steam generating plant comprising a steam generating circuit in which the water being evaporated is circulated by a positively acting circulating means, a feed water preheater connected to discharge into said circuit the feed water after being heated in said preheater, a connection between the discharge of said circulating means and the water inlet side of the preheater, a flow controlling device in said connection, means for conducting feed water to said preheater, a device controlling the flow of feed in said conducting means, means connected to said devices for actuating said flow controlling device in said connection in a predetermined relation to the operation of said device controlling the flow of feed to said preheater, a second connection between the discharge of said circulating means and the water inlet side of the preheater, a second flow controlling device in said last mentioned connection, and means controlled by the condition of the fluid in the feed water preheater for operating said second flow controlling device.

9. Steam generating plant comprising a steam generating circuit in which the water being evaporated is circulated by a positively acting circulating means, a feed water preheater connected to discharge into said circuit the feed water after being heated in said preheater, a connection between the discharge of said circulating means and the water inlet side of the preheater, a flow controlling device in said connection, means for conducting feed water to said preheater, a device controlling the flow of feed in said conducting means, means for actuating said flow controlling device in said connection, said actuated means being connected to and being arranged in such relation to the operation of said device controlling the flow of feed water to said preheater that flow of circulating water is caused through said connection to said preheater in inverse relation to the flow of feed-water to said preheater, a second connection between the discharge of said circulating means and the water inlet side of the preheater, a second flow controlling device in said last mentioned connection, and thermally controlled means responsive to the condition of the fluid in the feed water preheater for operating said second flow controlling device.

10. Steam generating plant comprising a steam generating circuit in which the water being evaporated is positively circulated, a feed water preheater connected to discharge into said circuit the feed water after passing through said preheater, means for causing water from said circuit to flow through said preheater, means actuated in accordance with variations in the volume of water within said steam generating circuit and arranged to vary, constantly in direct relation to variations in said volume, the flow of water from said circuit through said preheater, and additional means actuated in response to predetermined thermal conditions of the fluid flow through said preheater for causing additional water to be supplied to said preheater from the positively circulated steam generating circuit.

WALTER DOUGLAS LA MONT.